(12) United States Patent
Chen

(10) Patent No.: US 12,737,070 B2
(45) Date of Patent: Sep. 15, 2026

(54) METHOD FOR SYNCHRONIZATION BETWEEN ACTIVE STYLUS AND TOUCH SCREEN, ACTIVE STYLUS

(71) Applicant: SHENZHEN GOODIX TECHNOLOGY CO., LTD., Shenzhen (CN)

(72) Inventor: Xianpeng Chen, Shenzhen (CN)

(73) Assignee: SHENZHEN GOODIX TECHNOLOGY CO., LTD. (CN)

( * ) Notice: Subject to any disclaimer, the term of this patent is extended or adjusted under 35 U.S.C. 154(b) by 0 days.

(21) Appl. No.: 19/185,425

(22) Filed: Apr. 22, 2025

(65) Prior Publication Data

US 2025/0251817 A1 Aug. 7, 2025

Related U.S. Application Data

(63) Continuation of application No. PCT/CN2022/128759, filed on Oct. 31, 2022.

(51) Int. Cl.
*G06F 3/041* (2006.01)
*G06F 3/044* (2006.01)

(52) U.S. Cl.
CPC ........ *G06F 3/04162* (2019.05); *G06F 3/0441* (2019.05); *G06F 3/0442* (2019.05)

(58) Field of Classification Search
None
See application file for complete search history.

(56) References Cited

U.S. PATENT DOCUMENTS

2016/0195944 A1 7/2016 Gur et al.
2016/0239123 A1 8/2016 Ye et al.
2021/0103374 A1 4/2021 Liang
2022/0057894 A1 2/2022 Koike et al.

FOREIGN PATENT DOCUMENTS

CN 102902383 A 1/2013
CN 109074200 A 12/2018
CN 109906426 A 6/2019
CN 110832447 A 2/2020
CN 111742287 A 10/2020
CN 112905047 A 6/2021
CN 113646768 A 11/2021
JP 2018063733 A 4/2018
WO WO-2022165839 A1 * 8/2022 ............. G06F 3/041

OTHER PUBLICATIONS

PCT international search report of PCT/CN2022/128759 issued by CNIPA on Jun. 15, 2023.
European extended search report of EP22963768.1 issued by EPO on Oct. 20, 2025.

* cited by examiner

*Primary Examiner* — Nicholas J Lee
(74) *Attorney, Agent, or Firm* — Emerson, Thomson & Bennett, LLC; Roger D. Emerson; Peter R. Detorre

(57) ABSTRACT

A method for synchronization between an active stylus and a touch screen, and an active stylus are provided, which can improve the synchronization speed between the touch screen and the active stylus. The method includes: transmitting a pre-synchronization signal to the touch screen, wherein the pre-synchronization signal is used to determine a target region where the active stylus is located on the touch screen, so that the touch screen transmits an uplink signal in the target region; detecting the uplink signal; and performing, in response to the uplink signal being detected, time synchronization with the touch screen based on the uplink signal.

13 Claims, 11 Drawing Sheets

| 1 | | | | | | |
|---|---|---|---|---|---|---|
| 2 | | | | | | |
| 3 | | | | | | |
| 4 | | | | | | |
| 5 | 1 | | | | | |
| 6 | | | | | | |
| 7 | | | | | | |
| 8 | | | | | | |
| 9 | | | | | | |
| 10 | | | | | | |
| 11 | | | | | | |
| 12 | | 2 | | | | |
| 13 | | | | | | |
| 14 | | | | | | |
| 15 | | | | | | |
| 16 | | | | | | |
| 17 | | | | | | |
| 18 | | | | | | |
| 19 | | | 3 | | | |
| 20 | | | | | | |
| 21 | | | | | | |
| 22 | | | | | | |
| 23 | | | | | | |
| 24 | | | | | | |
| 25 | | | | | | |
| 26 | | | | 1 | | |
| 27 | | | | | | |
| 28 | | | | | | |
| 29 | | | | | | |
| 30 | | | | | | |
| 31 | | | | | | |
| 32 | | | | | | |
| 33 | | | | | 2 | |
| 34 | | | | | | |
| 35 | | | | | | |
| 36 | | | | | | |
| 37 | | | | | | |
| 38 | | | | | | |
| 39 | | | | | | |
| 40 | | | | | | 3 |
| 41 | | | | | | |
| 42 | | | | | | |
| 43 | | | | | | |
| 44 | | | | | | |

FIG. 5

METHOD FOR SYNCHRONIZATION BETWEEN ACTIVE STYLUS AND TOUCH SCREEN, ACTIVE STYLUS

CROSS REFERENCE

The present disclosure is a continuation application of PCT/CN 2022/128759, filed on Oct. 31, 2022 and entitled "METHOD FOR SYNCHRONIZATION BETWEEN ACTIVE STYLUS AND TOUCH SCREEN, ACTIVE STYLUS AND TOUCH SCREEN", which is incorporated herein by reference in its entirety.

TECHNICAL FIELD

Embodiments of the present disclosure relate to the field of an active stylus, and more specifically relate to a method for synchronization between an active stylus and a touch screen, and an active stylus.

BACKGROUND

With the popularity of capacitive displays, the capacitive active stylus has been increasingly widely applied. Protocol between an active stylus and a touch screen is also constantly evolving, and its development trend has evolved from early one-way communication to current two-way communication. However, no matter what communication protocol is used, a connection between the touch screen and the active stylus needs to be established merely based on signal transceiving time sequence and cycle agreed in the protocol, so that the touch screen collects a coordinate signal of the active stylus, thereby implementing a writing function of the active stylus. Hence, the active stylus works on the premise of temporal synchronization with the touch screen, thereby establishing the connection. To this end, how to effectively implement synchronization between the touch screen and the active stylus has become a problem to be urgently solved.

SUMMARY

Embodiments of the present disclosure provide a method for synchronization between an active stylus and a touch screen, and an active stylus, and can improve synchronization speed between the touch screen and the active stylus.

In a first aspect, a method for synchronization between an active stylus and a touch screen is provided. The method is implemented by the active stylus, and includes: transmitting a pre-synchronization signal to the touch screen, wherein the pre-synchronization signal is used to determine a target region where the active stylus is located on the touch screen, so that the touch screen transmits an uplink signal in the target region; detecting the uplink signal; and performing, in response to the uplink signal being detected, time synchronization with the touch screen based on the uplink signal.

In this embodiment, the pre-synchronization signal is additionally provided during the synchronization between the active stylus and the touch screen. The active stylus transmits the pre-synchronization signal to the touch screen, so that the touch screen can pre-ascertain an approximate position of the active stylus based on the pre-synchronization signal, thereby transmitting the uplink signal to the active stylus only in a region in the vicinity of the position. Compared with the mode of transmitting an uplink signal on a full screen, the method reduces power consumption of the touch screen and its interference with a display screen; and compared with the mode of transmitting an uplink signal alternately in regions, the method reduces scan blind spot and scan delay of the touch screen, optimizes synchronization speed between the touch screen and the active stylus, and improves stability of write response.

In an implementation, the method further includes: stopping, in response to the uplink signal not being detected within a preset duration, transmitting the pre-synchronization signal. If the active stylus fails to detect the uplink signal within the preset duration, it is possible that its user does not use the active stylus for writing in a recent period. The active stylus can only detect the uplink signal and stop transmitting the pre-synchronization signal, thereby reducing power consumption of the active stylus.

In an implementation, the method further includes: transmitting, in response to the uplink signal, a downlink signal to the touch screen, wherein the downlink signal is used to determine the position of the tip portion of the active stylus.

In an implementation, a signal length of the pre-synchronization signal is smaller than a signal length of the downlink signal.

In an implementation, a frequency point of the pre-synchronization signal is different from a frequency point of the downlink signal; and/or encoding of the pre-synchronization signal is different from encoding of the downlink signal; and/or the pre-synchronization signal is not encoded, while the downlink signal is an encoded signal; and/or a format of the pre-synchronization signal is different from a format of the downlink signal.

In an implementation, the touch screen comprises a plurality of regions for transmitting the uplink signal, and the plurality of regions include the target region. The touch screen is regionalized into a plurality of regions, and the touch screen transmits the uplink signal merely in the target region where the active stylus is located, so that the active stylus can receive the uplink signal as quickly as possible, thereby optimizing the synchronization speed between the touch screen and the active stylus, and improving the stability of the write response.

In a second aspect, a method for synchronization between an active stylus and a touch screen is provided. The method is implemented by the touch screen, and includes: detecting a pre-synchronization signal transmitted from the active stylus; determining, in response to the pre-synchronization signal being detected, a target region where the active stylus is located on the touch screen based on the pre-synchronization signal; and transmitting an uplink signal to the active stylus in the target region, wherein the uplink signal is used to perform time synchronization between the active stylus and the touch screen.

In this embodiment, the pre-synchronization signal is additionally provided during the synchronization between the active stylus and the touch screen. The touch screen receives the pre-synchronization signal transmitted from the active stylus, so that the touch screen can pre-ascertain an approximate position of the active stylus, thereby transmitting the uplink signal to the active stylus only in a region in the vicinity of the position. Compared with the mode of transmitting an uplink signal on a full screen, the method reduces power consumption of the touch screen and its interference with a display screen; and compared with the mode of transmitting an uplink signal alternately in regions, the method reduces scan blind spot and scan delay of the touch screen, optimizes synchronization speed between the touch screen and the active stylus, and improves stability of write response.

In an implementation, the touch screen comprises a plurality of regions for transmitting the uplink signal, and the plurality of regions include the target region. The touch screen is regionalized into a plurality of regions, and the touch screen transmits the uplink signal merely in the target region where the active stylus is located, so that the active stylus can receive the uplink signal as quickly as possible, thereby optimizing the synchronization speed between the touch screen and the active stylus, and improving the stability of the write response.

In an implementation, the method further includes: transmitting, in response to the pre-synchronization signal not being detected within a preset duration, or synchronization between the active stylus and the touch screen failing for N consecutive times, the uplink signal alternately in the plurality of regions, wherein N is a preset positive integer larger than 1.

If the pre-synchronization signal is not detected within the preset duration, or the synchronization between the active stylus and the touch screen fails for N consecutive times, the touch screen switches to an original synchronization mode of USI protocol, such as transmitting the uplink signal alternately in the regions, thereby ensuring compatibility of the protocol.

In an implementation, the method further includes: not transmitting the uplink signal before the pre-synchronization signal is detected, thereby minimizing the power consumption of the touch screen and reducing interference caused by the uplink signal to display of the display screen; or transmitting the uplink signal alternately in the plurality of regions before the pre-synchronization signal is detected, thereby ensuring the compatibility of the protocol.

In an implementation, the method further includes: receiving a downlink signal transmitted from the active stylus, and determining the position of the tip portion of the stylus based on the downlink signal.

In an implementation, a signal length of the pre-synchronization signal is smaller than a signal length of the downlink signal.

In an implementation, a frequency point of the pre-synchronization signal is different from a frequency point of the downlink signal; and/or encoding of the pre-synchronization signal is different from encoding of the downlink signal; and/or the pre-synchronization signal is not encoded, while the downlink signal is an encoded signal; and/or a format of the pre-synchronization signal is different from a format of the downlink signal.

In a third aspect, an active stylus is provided. The active stylus comprises: a transmission module configured to transmit a pre-synchronization signal to a touch screen, wherein the pre-synchronization signal is used to determine a target region where the active stylus is located on the touch screen, so that the touch screen transmits an uplink signal in the target region; and a receiving module configured to detect the uplink signal, and perform, in response to the uplink signal being detected, time synchronization with the touch screen based on the uplink signal.

In an implementation, the transmission module is further configured to: stop, in response to failure to detect the uplink signal by the receiving module within a preset duration, transmitting the pre-synchronization signal.

In an implementation, the transmission module is further configured to: transmit, in response to the uplink signal, a downlink signal to the touch screen, wherein the downlink signal is used to determine the position of the tip portion of the active stylus.

In an implementation, a signal length of the pre-synchronization signal is smaller than a signal length of the downlink signal.

In an implementation, a frequency point of the pre-synchronization signal is different from a frequency point of the downlink signal; and/or encoding of the pre-synchronization signal is different from encoding of the downlink signal; and/or the pre-synchronization signal is not encoded, while the downlink signal is an encoded signal; and/or a format of the pre-synchronization signal is different from a format of the downlink signal.

In an implementation, the touch screen comprises a plurality of regions for transmitting the uplink signal, and the plurality of regions include the target region.

In a fourth aspect, a touch screen is provided. The touch screen comprises: a receiving module configured to detect a pre-synchronization signal transmitted from an active stylus; a processing module configured to determine, in response to the pre-synchronization signal being detected by the receiving module, a target region where the active stylus is located on the touch screen based on the pre-synchronization signal; and a transmission module configured to transmit an uplink signal to the active stylus in a region where the tip portion of the stylus is located among a plurality of regions of the touch screen, wherein the uplink signal is used to perform time synchronization between the active stylus and the touch screen.

In an implementation, the touch screen comprises a plurality of regions for transmitting the uplink signal, and the plurality of regions include the target region.

In an implementation, the transmission module is further configured to: transmit, in response to the pre-synchronization signal not being detected within a preset duration, or synchronization between the active stylus and the touch screen failing for N consecutive times, the uplink signal alternately in the plurality of regions, wherein N is a preset positive integer larger than 1.

In an implementation, the transmission module is further configured to: not transmit the uplink signal before the pre-synchronization signal is detected; or transmit the uplink signal alternately in the plurality of regions before the pre-synchronization signal is detected.

In an implementation, the receiving module is further configured to receive a downlink signal transmitted from the active stylus, and determine the position of the stylus tip portion based on the downlink signal.

In an implementation, a signal length of the pre-synchronization signal is smaller than a signal length of the downlink signal.

In an implementation, a frequency point of the pre-synchronization signal is different from a frequency point of the downlink signal; and/or encoding of the pre-synchronization signal is different from encoding of the downlink signal; and/or the pre-synchronization signal is not encoded, while the downlink signal is an encoded signal; and/or a format of the pre-synchronization signal is different from a format of the downlink signal.

In a fifth aspect, an apparatus for synchronization between an active stylus and a touch screen is provided. The apparatus comprises a processor and a memory, the memory is configured to store a computer program, and the processor is configured to invoke and run the computer program stored in the memory, to implement the method in the first aspect or in any one possible implementation of the first aspect.

In a sixth aspect, an apparatus for synchronization between an active stylus and a touch screen is provided. The apparatus comprises a processor and a memory, the memory is configured to store a computer program, and the processor is configured to invoke and run the computer program stored in the memory, to implement the method in the second aspect or in any one possible implementation of the second aspect.

BRIEF DESCRIPTION OF DRAWINGS

FIG. 5 is a schematic diagram of a mode of scanning an uplink signal alternately based on the number of channels.

DETAILED DESCRIPTION

Technical solutions of the present disclosure will be described below with reference to the drawings.

Figure 1:
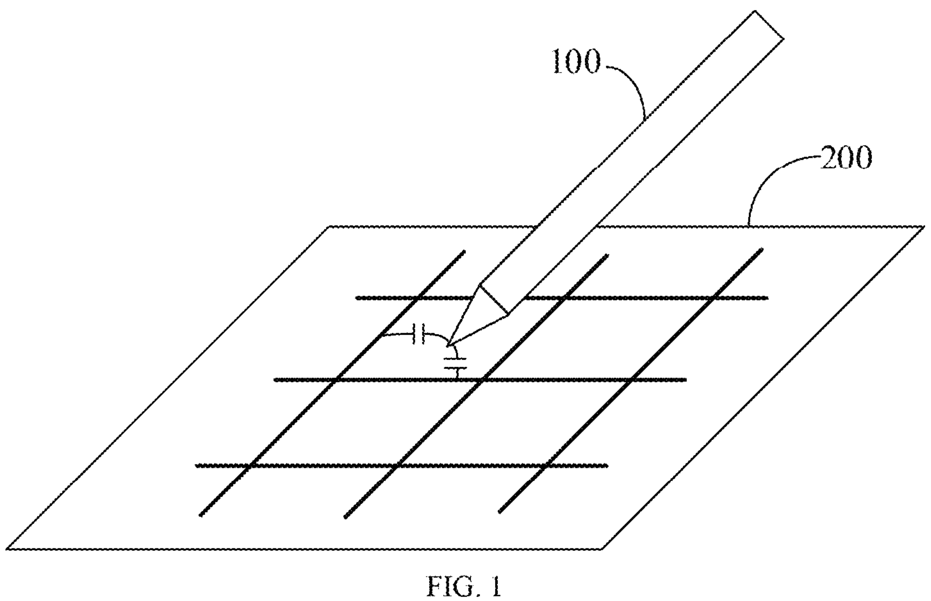
FIG. 1 is a schematic principle diagram of use of an active stylus on a touch screen.

When a capacitive active stylus (abbreviated as the active stylus below) is used practically, a touch screen needs to acquire the coordinates of the tip portion of the active stylus, thereby displaying the writing track of the active stylus based on the coordinates of the stylus tip portion. As an example, as shown in FIG. 1, a certain number of horizontal and longitudinal detection electrodes, also referred to as detection channels, are distributed on the touch screen 200. When a drive signal outputted from a stylus point electrode of the active stylus 100 acts on a position of the touch screen 200, a corresponding detection signal will be generated in the horizontal and longitudinal detection channels corresponding to the position. Position coordinates of the tip portion of the active stylus 100 on the touch screen 200 can be calculated based on the detection signal. The drive signal transmitted from the active stylus 100 is also referred to as, e.g., an encoding signal, a stylus signal, or a downlink signal, and a process of transmitting the drive signal therefrom is referred to as encoding.

At present, electronic devices, such as a mobile phone, a tablet computer, and a notebook computer, all support functions of the active stylus, and users have increasingly higher performance requirements for the active stylus. A touch screen of an electronic device needs to detect a touch operation of a finger and a write operation of the active stylus. Further, considering power consumption, the touch screen cannot take up all the time to detect the active stylus in real time. To this end, both the touch screen and the active stylus must complete detection of the position of the stylus tip portion and communication between them based on an agreed time window.

The active stylus and the touch screen are two mutually independent asynchronous communication systems. The touch screen cannot predict when a user uses the active stylus to write on the touch screen. That is, the touch screen cannot determine when to start detecting the drive signal emitted from the active stylus. Therefore, the active stylus and the touch screen must be temporally synchronized, and need to maintain the synchronization for a long time during the writing, so that the touch screen can stably and accurately detect the drive signal emitted from the active stylus.

Figure 2:
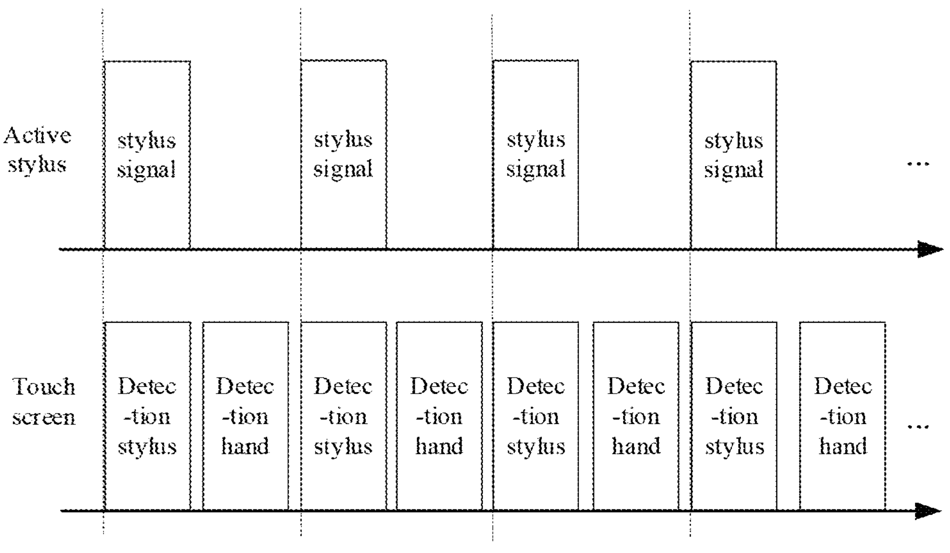
FIG. 2 is a schematic diagram of synchronization between a touch screen and an active stylus.

For example, as shown in FIG. 2, when timing of occurrence of a stylus signal of the active stylus and a detection window of the touch screen are temporally aligned, it means that synchronization is implemented between the touch screen and the active stylus. Only in this way, can the touch screen correctly detect the signal of the active stylus, and then obtain information of the active stylus, e.g., a coordinate position, pressure sensitivity, and a tilt angle. In addition, the touch screen detects finger touch within the time of not detecting the active stylus.

Generally, the synchronization between the touch screen and the active stylus is implemented in two modes as follows. One mode is that the active stylus encodes periodically. The touch screen frequently detects stylus signals, regulates its own detection cycle, and gradually aligns its detection cycle with an encoding cycle of the active stylus, such as using an active stylus of Microsoft Pen Protocol (MPP). The other mode is that the touch screen periodically transmits beacon signals, such as Direct Sequence Spread Spectrum (DSSS) encoded signals, which are detected by the active stylus. The active stylus detects a correct beacon signal, and then emits a drive signal based on agreed time delay, thereby implementing synchronization between the touch screen and the active stylus, such as an active stylus using Universal Stylus Initiative (USI) protocol.

For the first synchronization mode, the active stylus periodically encodes, and the synchronization is performed from the touch screen to the active stylus with low synchronization precision; and for the second synchronization mode, the touch screen transmits a beacon signal, and the synchronization is performed from the touch screen to the active stylus with high synchronization precision, but the beacon signal has poor anti-interference effects. In a noisy scenario, the active stylus tends to fail in receiving the correct beacon signal, thereby resulting in synchronization failure.

Figure 3:
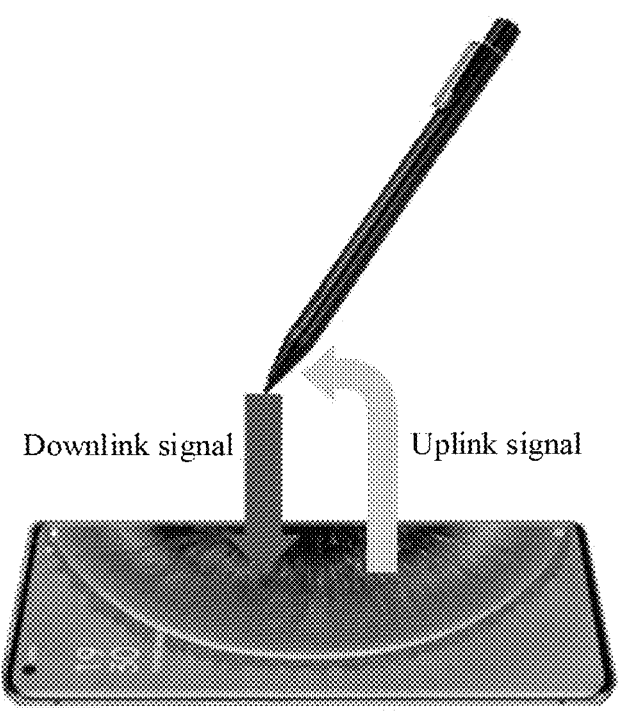
FIG. 3 is a schematic diagram of signal transmission between a touch screen and an active stylus.

As shown in FIG. 3, for an active stylus using USI protocol, based on a signal transmission direction between the touch screen and the active stylus, signal transmission between the touch screen and the active stylus is defined as follows: 1) Uplink signal: a signal that is generated by a touch chip of the touch screen and transmitted to the active stylus, is generally in DSSS format, can be used as a beacon signal for temporal synchronization between the touch screen and the active stylus, and can be used to transmit, e.g., operating frequency point and cyclical temporal data required by the touch screen; and 2) Downlink signal: a signal that is generated by an electrode of the stylus tip portion and transmitted to the touch screen, is generally a high-voltage pulse width modulation (PWM) signal of 10 V-40 V, and can transmit data such as the pressure of the stylus tip portion and the quantity of electric charges using a modulation mode, such as Amplitude Shift Keying (ASK) modulation, Frequency Shift Keying (FSK) modulation, or Phase Shift Keying (PSK) modulation.

At present, some new active stylus protocols are each be additionally provided with an uplink synchronization mode. That is, the touch chip of the touch screen uses DSSS encoding to periodically emit an uplink synchronization signal to the touch screen, such as the beacon signal. The active stylus periodically enables a window for receiving and detecting the uplink signal. The active stylus will, when approaching the touch screen, detect the beacon signal, and use this signal as a time anchor point for touch screen-active stylus interaction to complete precise temporal synchronization of touch screen-active stylus. The above USI active stylus protocol is a most typical general protocol using uplink synchronization.

This type of active stylus has the following advantages: two-way communication between the touch screen and the active stylus is implemented based on the uplink signal and the downlink signal; and the synchronization between the touch screen and the active stylus implemented based on the uplink signal has higher synchronization precision. However, this type of active stylus also has the following defects: first, the active stylus cannot predict, before approaching the touch screen, a write position of the active stylus on the touch screen, and requires the touch screen to transmit the uplink signal on the full screen, thereby resulting in much power consumption. Moreover, due to large signal energy, the uplink signal tends to cause interference to the display screen, thus affecting display effects of the display screen; and second, the uplink signal is susceptible to interference from an external environment, the interfered uplink signal may fail to be correctly received by the active stylus, thereby failing in synchronization between the touch screen and the active stylus, so that the active stylus is unable to write normally. Interferences, such as a charger, power grid, and spatial electromagnetic noise, may all affect the normal use of the active stylus.

Figure 4:
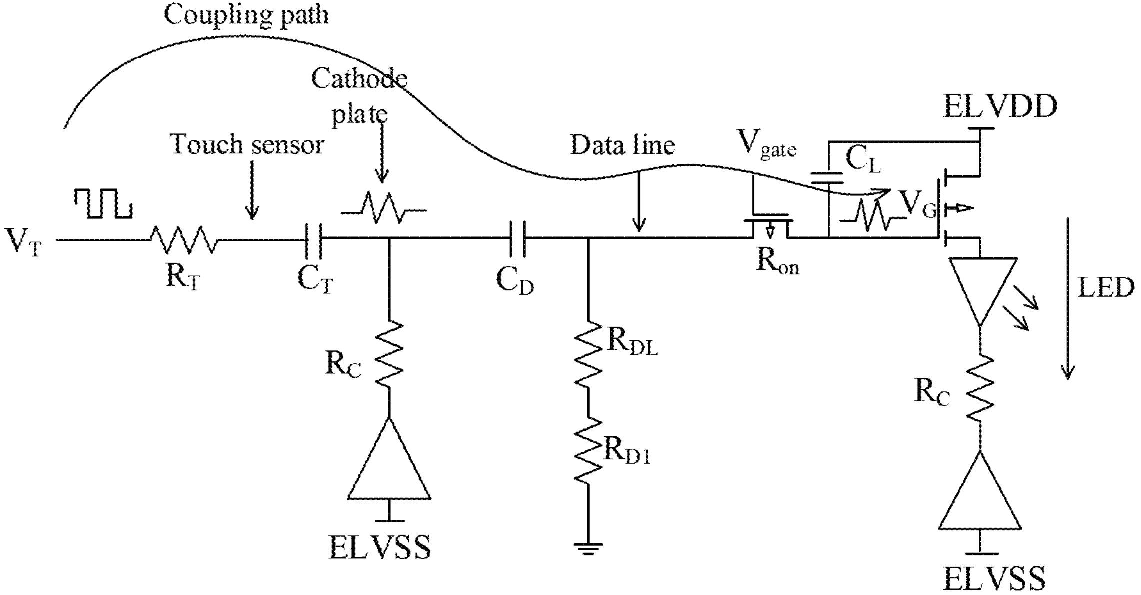
FIG. 4 is a schematic diagram of an interference model between a touch screen and a display screen.

FIG. 4 shows a schematic diagram of an interference model between a touch screen and a display screen. As the thickness of an electronic device decreases, particularly products such as a flexible screen and a foldable screen, the distance between a cathode plate of the display screen and a touch sensor becomes shorter, the coupling capacitance CT between the cathode plate and the touch sensor increases, and signal interference between the display screen and the touch screen increases. When the touch screen emits an uplink signal, if a drive voltage is too high or a large number of channels are driven, the display effect of the display screen will be impacted, resulting in the phenomena such as screen flickering and water ripples, which are unacceptable to a user. As shown in FIG. 4, an excitation signal of the touch chip affects the display effects of the display screen. When a voltage V gate is switched on, the excitation signal of the touch chip is coupled to a data line of a display driver through the cathode plate, thereby affecting gate voltage V G of a MOS transistor in a display drive circuit, directly affecting current of a light-emitting diode in the display screen, and then affecting the display effects of the display screen.

To reduce the impact of the uplink signal on the display screen, the touch screen can emit the uplink signal by alternately scanning based on the number of channels. For example, as shown in FIG. 5, detection channels of the full screen are divided into an upper group, a middle group, and a lower group of channels with complementary positions. FIG. 5 takes 44 channels as an example. Usually, a channel configured to emit a drive signal is referred to as a Tx channel, and a channel configured to output a corresponding detection signal is referred to as an Rx channel. FIG. 5 takes the Tx channel as an example. The touch chip transmits an uplink signal in a 1st cycle using the 1st group of channels and positive and negative codes, the touch chip transmits an uplink signal in a 2nd cycle using the 2nd group of channels and positive and negative codes, and the touch chip transmits an uplink signal in a 3rd cycle using the 3rd group of channels and positive and negative codes. In this way, it needs to take 3 cycles to completely scan positions on the full screen. This mode reduces the impact of the uplink signal on the display screen, but obviously increases scanning time of the uplink signal from 1 cycle to 3 cycles, thereby delaying the time for the touch screen to detect the stylus signal by 2-3 cycles, thus slowing down the stylus feed rate, causing problems such as missing responses when the stylus writes quickly or clicks, and seriously affecting writing experience of the users.

This mode of alternately scanning based on the number of channels also has the problem of poor anti-interference ability. Environmental interferences, such as display screen noise, charger, and lamp flicking, may all affect signal detection between the touch screen and the active stylus, thereby resulting in failure in correct synchronization and writing disconnection of the active stylus during writing. The active stylus fails to be used normally in case of severe interference.

To this end, the present disclosure provides a synchronization solution, intended to solve the problem of failure in effective synchronization between the touch screen and the active stylus by additionally providing a downlink pre-synchronization signal, so that the touch screen can pre-ascertain an approximate position of the active stylus on the touch screen based on the pre-synchronization signal, and emit an uplink signal in a local region of the touch screen based on this position, thus ensuring that the active stylus can, when approaching the touch screen, receive an uplink signal from a region in the vicinity thereof, thereby reducing the scan blind spot and scan delay uncertainty of the uplink signal, optimizing the synchronization speed, improving the stability of the write response, and retaining the compatibility of the USI protocol.

The technical solutions of the present disclosure will be described in detail below with reference to FIGS. 6-10.

Figure 6:
FIG. 6 is an interaction flowchart of a synchronization method in an embodiment of the present disclosure.
Figure 6:
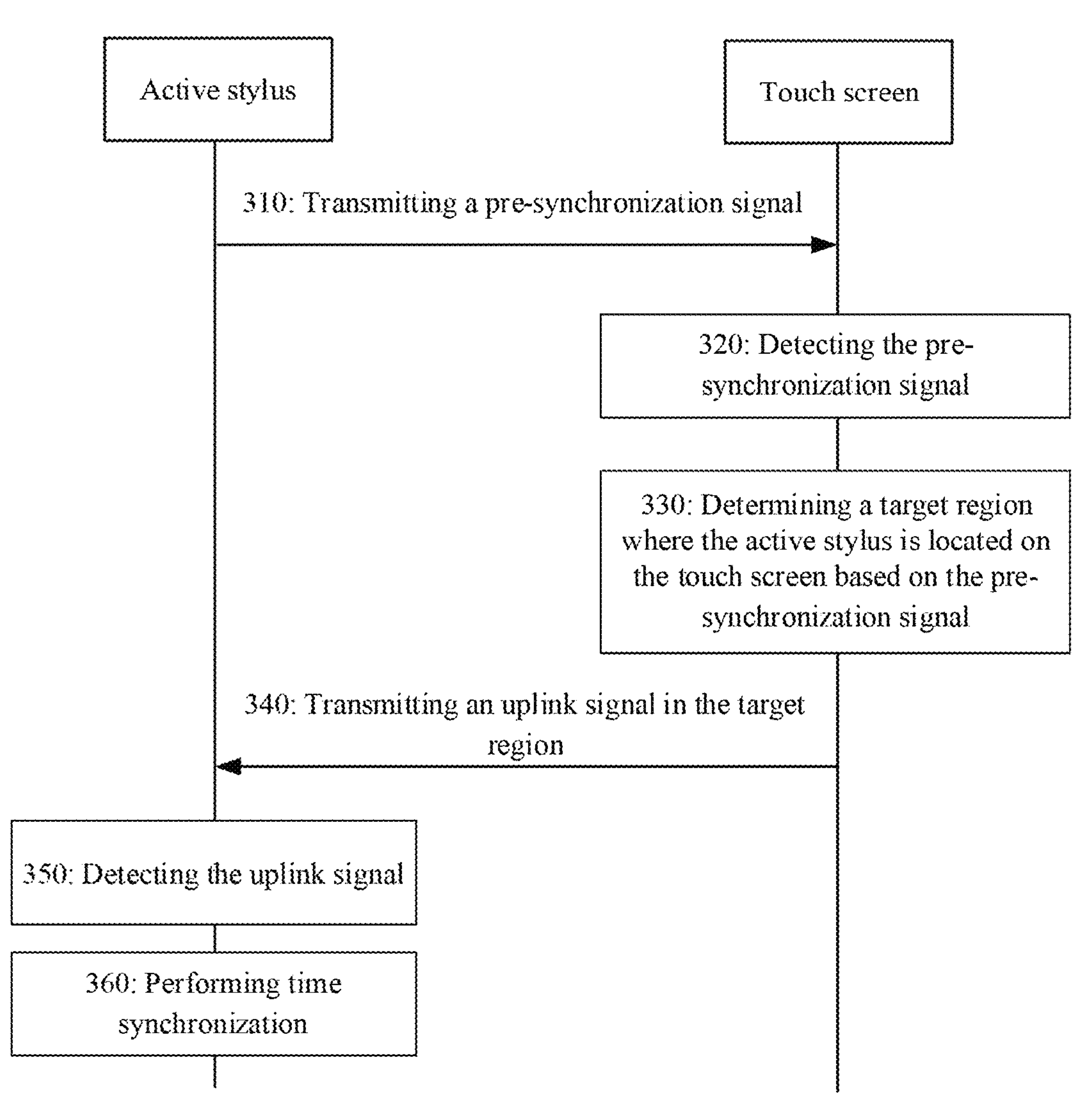

FIG. 6 shows an interaction flowchart of a synchronization method in an embodiment of the present disclosure. The method shown in FIG. 6 is implemented by an active stylus and a touch screen, and is used to implement time synchronization between the active stylus and the touch screen, which is abbreviated as synchronization below. As shown in FIG. 6, the method 300 includes some or all of the following steps.

Step 310: transmitting, via an active stylus, a pre-synchronization signal to a touch screen.

The pre-synchronization signal is used to determine a target region where the active stylus is located on the touch screen.

Step 320: detecting, via the touch screen, the pre-synchronization signal transmitted from the active stylus.

If the touch screen detects the pre-synchronization signal transmitted from the active stylus, that is, the touch screen successfully receives the pre-synchronization signal, step 330 is implemented.

Step 330: determining a target region where the active stylus is located on the touch screen based on the pre-synchronization signal.

For example, the touch screen comprises a plurality of regions for transmitting an uplink signal, the plurality of regions include the target region, and the target region is the region where the active stylus is located among the plurality of regions. For another example, the target region may be a region within a preset range in the vicinity of the active stylus, such as a region where a preset number of channels in the vicinity of the active stylus are located.

Step 340: transmitting, via the touch screen, an uplink signal to the active stylus in the target region.

This uplink signal is used for time synchronization between the active stylus and the touch screen, and may also be referred to as a synchronization signal, such as the above beacon signal. In addition, the uplink signal may further carry data such as work frequency point and work cycle of the touch screen.

Step 350: detecting, via the active stylus, the uplink signal transmitted from the touch screen in the target region.

If the active stylus detects the uplink signal transmitted from the touch screen, that is, the active stylus successfully receives the uplink signal, step 360 is implemented.

Step 360: performing, via the active stylus, time synchronization with the touch screen based on the uplink signal.

Because the pre-synchronization signal is additionally provided during the synchronization between the active stylus and the touch screen, the active stylus transmits the pre-synchronization signal to the touch screen, so that the touch screen can pre-ascertain an approximate position of the active stylus based on the pre-synchronization signal, thereby transmitting the uplink signal to the active stylus only in a region in the vicinity of the position.

Compared with the above mode of transmitting an uplink signal on a full screen, the synchronization method of the present disclosure reduces power consumption of the touch screen and its interference with a display screen; and compared with the mode of transmitting an uplink signal alternately in regions, the synchronization method of the present disclosure reduces scan blind spot and scan delay, optimizes the synchronization speed between the touch screen and the active stylus, and improves the stability of the write response.

In an implementation, the method 300 further includes: transmitting, via the active stylus and in response to the uplink signal, a downlink signal to the touch screen. The downlink signal includes, for example, information of the active stylus, such as the pressure, electric quantity, the position of the stylus tip portion, and ACK; and accordingly, the method 300 further includes: receiving, via the touch screen, the downlink signal transmitted from the active stylus, and determining information of the active stylus, such as the position of the stylus tip portion, based on the downlink signal.

It should be understood that in an embodiment of the present disclosure, the pre-synchronization signal can only be used to roughly determine the position of the active stylus. Since the touch screen and the active stylus are not synchronized in this case, the downlink signal received by the touch screen may be incomplete, thus cannot be used to calculate accurate coordinates, and can only represent that the active stylus approaches the touch screen approximately in a region. After synchronization between the touch screen and the active stylus, the touch screen can acquire a complete downstream signal transmitted from the active stylus, and accurately determine the position of the stylus tip portion accordingly.

The touch screen can determine whether it is currently synchronized with the active stylus. For example, if it does not receive an acknowledgement from the active stylus after transmitting the synchronization signal, it can be considered that the two have not yet been synchronized. In this case, the signal received by it can be considered as the pre-synchronization signal, so that the target region where the active stylus is located is determined based on the pre-synchronization signal, and the synchronization signal is transmitted in the target region.

The pre-synchronization signal may be same as, or may be different from, the downlink signal used to determine the information of the active stylus, such as the pressure, electric quantity, and the position of the stylus tip portion. For example, frequency point of the pre-synchronization signal may be different from that of the downlink signal; or encoding of the pre-synchronization signal may be different that of the downlink signal; or the pre-synchronization signal may not be encoded, and may only be a high-voltage pulse-width modulation (PWM) square wave, while the downlink signal is an encoded signal carrying the above information such as the pressure, electric quantity, and the position of the stylus tip portion; or format of the pre-synchronization signal may be different from that of the downlink signal. Generally, in order to improve synchronization efficiency, length of the pre-synchronization signal is smaller than length of the downlink signal.

The touch screen transmits the uplink signal to the active stylus through a TX channel and/or an Rx channel, and detects the downlink signal transmitted from the active stylus through the TX channel and/or the Rx channel. Generally, before synchronization between the active stylus and the touch screen, the signals may be transmitted and/or received only through the Tx channel; and after synchronization between the active stylus and the touch screen, since the position of the stylus tip portion can be accurately acquired, the signals may be transmitted and/or received through the Tx channel and the Rx channel corresponding to the position of the stylus tip portion.

For example, the touch screen can detect the pre-synchronization signal transmitted from the active stylus through the Tx channel. For example, the region where the Tx channel detecting the pre-synchronization signal is located can be determined as the target region. For another example, after detecting the pre-synchronization signal and determining the target region where the active stylus is located based on the pre-synchronization signal, the active stylus can transmit the uplink signal to the active stylus through the Tx channel in the target region. For another example, after synchronization between the touch screen and the active stylus, the touch screen can transmit the uplink signal to the active stylus through the Tx channel and the Rx channel corresponding to the position of the stylus tip portion in a time-sharing manner or simultaneously. For another example, after synchronization between the touch screen and the active stylus, the touch screen can detect the downlink signal transmitted from the active stylus through the Tx channel and the Rx channel, and determine two-dimensional coordinates of the position of the stylus tip portion based on the Tx channel and the Rx channel detecting the downlink signal.

Figure 7:
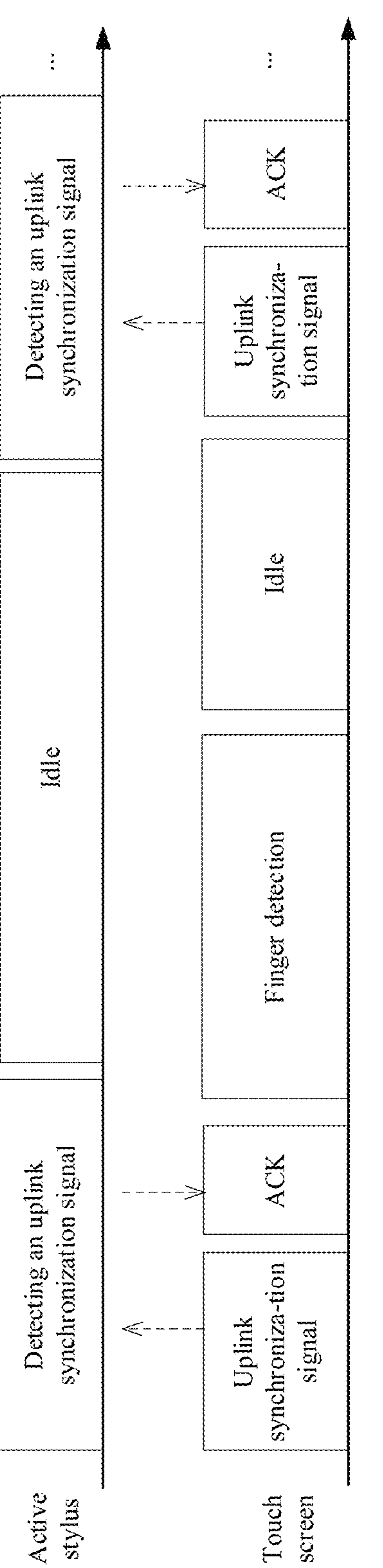
FIG. 7 is a sequence diagram of synchronization between an active stylus and a touch screen in the absence of a pre-synchronization signal.

FIG. 7 shows a sequence diagram of synchronization between an active stylus and a touch screen in the absence of a pre-synchronization signal. The touch screen periodically transmits an uplink signal. Only when detecting the uplink signal, will the active stylus enter a synchronization state, and generate encoding information, such as pressure, the quantity of electric charges, the position of the stylus tip portion, and acknowledgement (ACK), so that the touch screen detects information of the active stylus, such as the position of the stylus tip portion and pressure.

Figure 8:
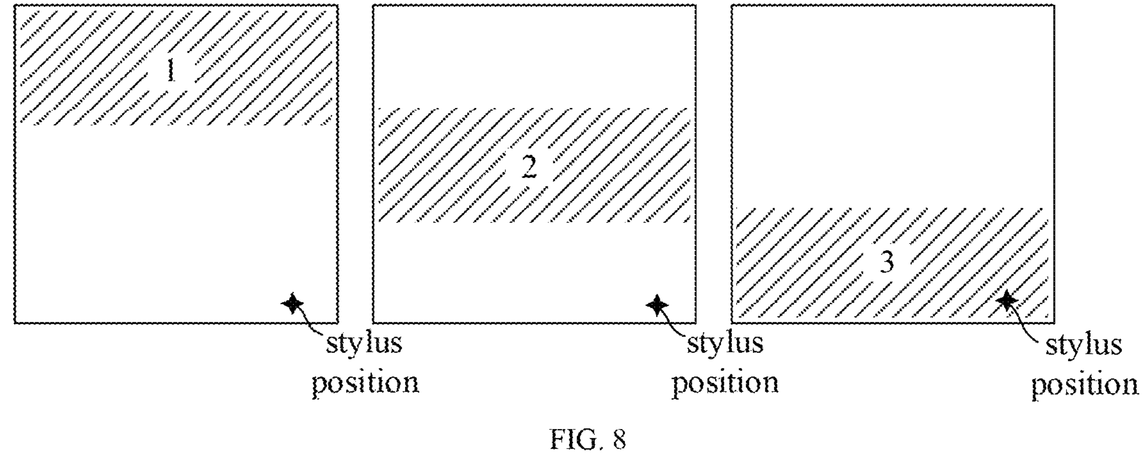
FIG. 8 is a schematic diagram of transmitting, via a touch screen, an uplink signal alternately in regions.

Since transmitting the uplink signal on the full screen will cause much interference to the display screen and cause large power consumption, as mentioned above, a mode of transmitting the uplink signal alternately in regions can be adopted. FIG. 8 shows a schematic diagram of transmitting, via a touch screen, an uplink signal alternately in regions. Taking 3 regions, namely region 1, region 2, and region 3, as an example, the touch screen cyclically transmits the uplink signal in the region 1, the region 2, and the region 3 successively from the region 1. Assuming that the active stylus writes at the bottom of the touch screen and the active stylus is located at the bottom of the touch screen, the active stylus cannot enter the synchronization state and start writing normally until a 3rd cycle. Assuming that the synchronization between the active stylus and the touch screen is not successful in the 3rd cycle due to, e.g., environmental noise, the active stylus cannot be re-synchronized until waiting for additional 3 cycles. In this way, the stylus feed time is uncertain, and a synchronization failure will cause delay of additional 3 cycles, thereby resulting in slow response when a user writes, missing the first stylus response, and seriously affecting the user experience.

Figure 9:
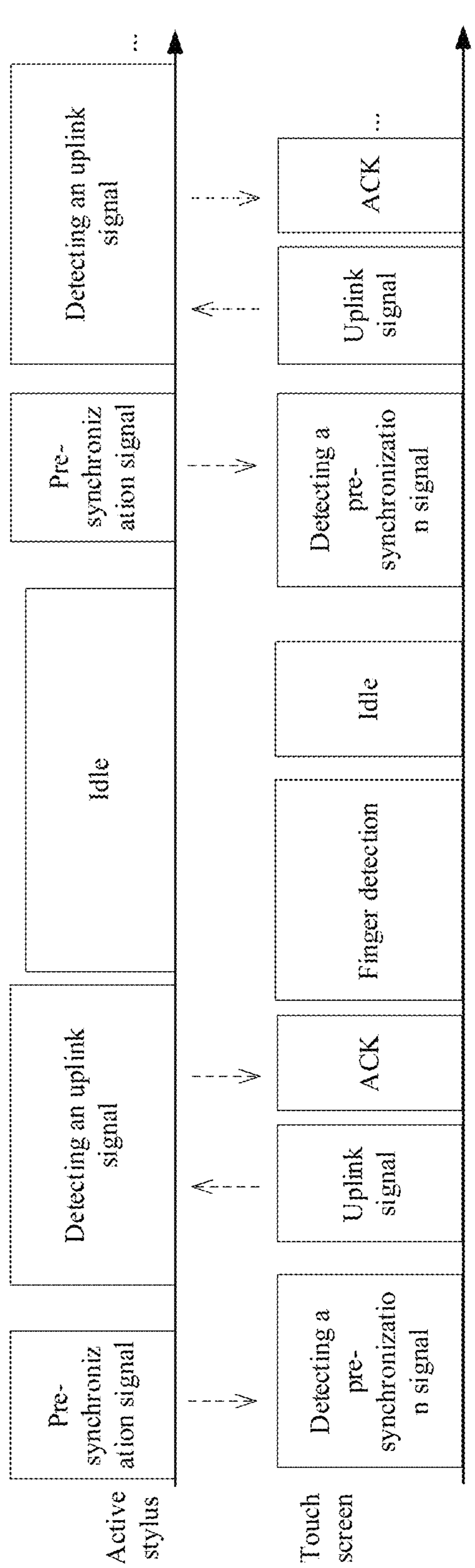
FIG. 9 is a sequence diagram of synchronization between an active stylus and a touch screen in the presence of a pre-synchronization signal.

However, when a bidirectional synchronization mechanism of the present disclosure is used, for example, FIG. 9 shows temporal synchronization between an active stylus and a touch screen in the presence of a pre-synchronization signal. During the synchronization, not only is an uplink signal used, but also the pre-synchronization signal is additionally provided. In each cycle, the active stylus still detects the uplink signal normally, and also transmits a downlink pre-synchronization signal using idle time. As shown in FIG. 9, the active stylus needs to transmit the pre-synchronization signal and detect the uplink signal during its cycle, and the touch screen needs to transmit the uplink signal, detect the pre-synchronization signal, and detect a finger during its cycle. If detecting the pre-synchronization signal of the active stylus, the touch screen will transmit the uplink signal in a region corresponding to the pre-synchronization signal in a targeted manner, wherein the region is exactly an approximate region where the active stylus is located. In this way, the active stylus can receive the uplink signal as quickly as possible, thereby optimizing the synchronization speed between the touch screen and the active stylus, and improving the stability of the write response. After synchronization between the active stylus and the touch screen, the transmission and detection of the pre-synchronization signal may no longer be performed in a next cycle; and if the synchronization is not successful, the transmission and detection of the pre-synchronization signal may be continued in the next cycle, for example, as shown in FIG. 9.

It should be understood that the active stylus may, during its cycle, first detect the uplink signal and then transmit the pre-synchronization signal; or may first transmit the pre-synchronization signal and then detect the uplink signal. The touch screen may, during its cycle, first detect the pre-synchronization signal and then transmit the uplink signal; or may first transmit the uplink signal and then detect the pre-synchronization signal. FIG. 9 is only an example, where, as an example, the pre-synchronization signal is first transmitted and detected, and then the uplink signal is transmitted and detected.

Figure 10:
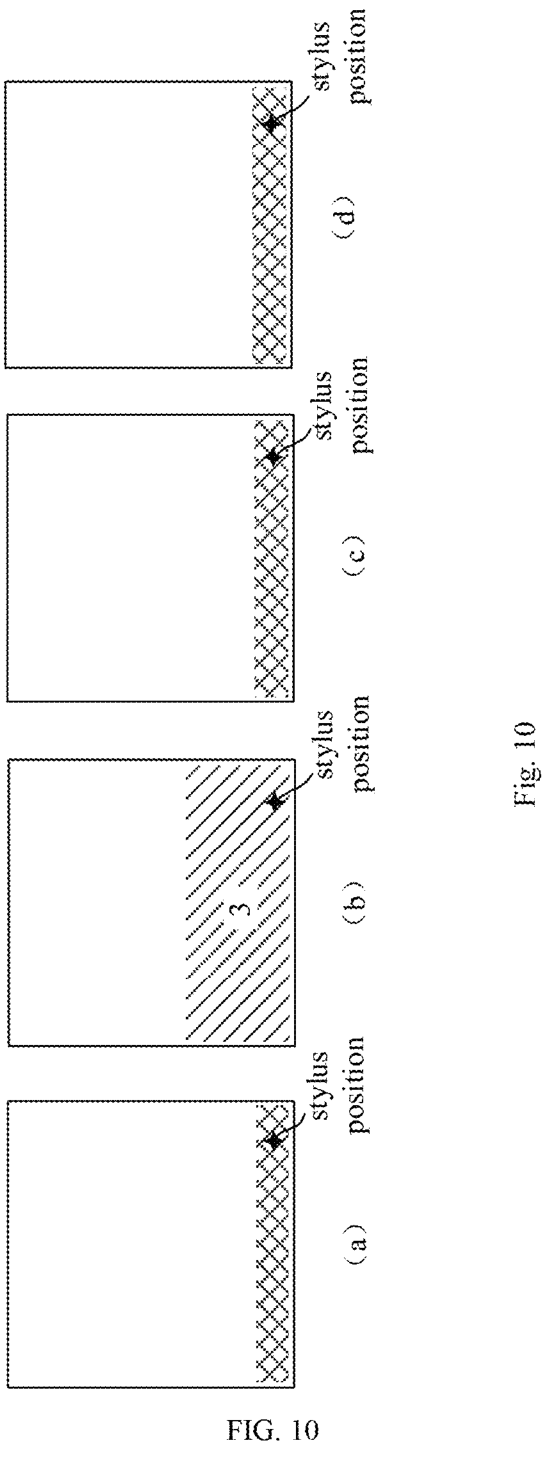
FIG. 10 is a schematic diagram of transmitting, via a touch screen, an uplink signal based on a position of an active stylus.

FIG. 10 shows a schematic diagram of transmitting, via a touch screen, an uplink signal based on a position of an active stylus. Still taking the 3 regions, namely the region 1, the region 2, and the region 3 shown in FIG. 8 as an example, after a pre-synchronization signal is additionally provided, the touch screen can pre-ascertain an approximate region where the active stylus is located based on the pre-synchronization signal, and directly transmit the uplink signal in a target region where the active stylus is located. Taking the Tx channel as an example, as shown in FIG. 10(*a*), assuming that the active stylus writes at the bottom of the touch screen and the active stylus is located at the bottom of the touch screen, the channels in the shaded region will detect the pre-synchronization signal of the active stylus. These detection channels are located in the region 3 among the 3 regions. Therefore, as shown in FIG. 10(*b*), the touch screen uses the region 3 as the target region, and transmits the uplink signal on the channels in the target region, for synchronization between the active stylus and the touch screen. As shown in FIGS. 10(*c*) and (*d*), in subsequent cycles, the touch screen remains synchronized with the active stylus, and the active stylus and the touch screen may no longer transmit and detect the pre-synchronization signal. When the active stylus writes, as shown in FIGS. 10(*c*) and (*d*), the touch screen and the active stylus can transmit the uplink signal only via a few channels in the vicinity of the position of the stylus tip portion, that is, the channels in the shaded region. The area of the regions shown in FIGS. 10(*c*) and (*d*) (or the number of detection channels corresponding to the regions) generally may be smaller than the area of each region among the region 1, the region 2, and the region 3 (or the area of the detection channels corresponding to each region). In the case of severe interference, the region 1, the region 2, and the region 3 cannot be set to have large areas, so that the area of the shaded regions shown in FIGS. 10(*c*) and (*d*) may also be equal to the area of each region among the region 1, the region 2, and the region 3.

When the pre-synchronization signal is used for synchronization, it generally only takes one cycle for the active stylus to receive the correct uplink signal and enter the synchronization state. Even if the active stylus does not successfully receive the uplink signal in an interference environment, the touch screen will still continue to transmit the uplink signal in the target region where the stylus tip portion is located based on the pre-synchronization signal in the next few cycles to ensure that the active stylus can correctly receive the uplink signal.

In an implementation, the method 300 further includes: not transmitting the uplink signal before the touch screen detects the pre-synchronization signal; or transmitting the uplink signal alternately in the plurality of regions before the touch screen detects the pre-synchronization signal.

Specifically, before detecting the pre-synchronization signal, the touch screen may not transmit the uplink signal. For example, before the active stylus approaches the touch screen, i.e., active stylus feeding, the touch screen may not transmit the uplink signal, only detects the pre-synchronization signal, and starts to transmit the uplink signal only after detecting the pre-synchronization signal, thereby minimizing the power consumption of the touch screen and reducing the interference caused by the uplink signal to the display of the display screen.

Figure 11:
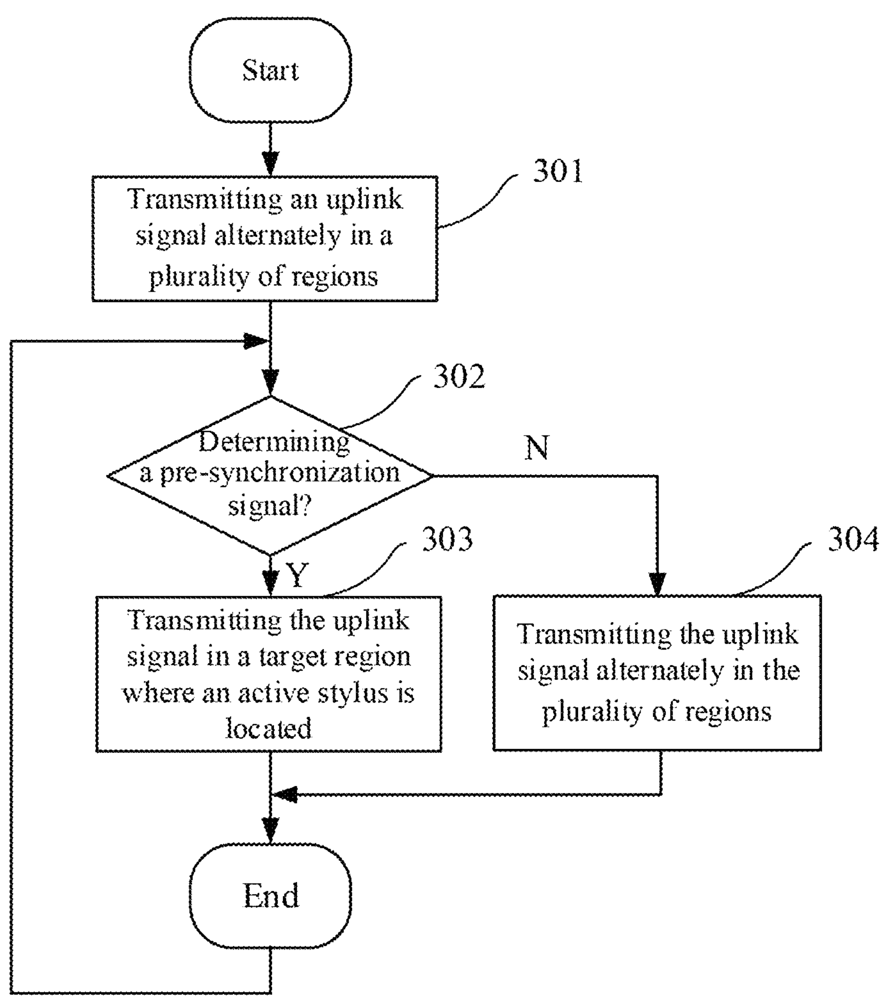
FIG. 11 is a schematic flowchart of operations that may be implemented by a touch screen before synchronization.

Before detecting the pre-synchronization signal transmitted from the active stylus, the touch screen may not only transmit the uplink signal, but also detect the downlink signal in each cycle, for example, transmits the uplink signal alternately in the plurality of regions based on the USI protocol, thereby ensuring the compatibility of the protocol. For example, FIG. 11 shows operations that may be implemented by a touch screen before synchronization is successful. As shown in FIG. 11, step 301: periodically transmitting an uplink signal via a touch screen, for example, transmitting the uplink signal alternately in a plurality of predetermined regions;

step 302: determining, via the touch screen, whether a pre-synchronization signal is detected;

if the touch screen detects the pre-synchronization signal, step 303 is implemented; and if the touch screen does not detect the pre-synchronization signal, step 304 is implemented;

step 303: transmitting, via the touch screen, the uplink signal in a target region where an active stylus is located;

for example, the touch screen determines the target region where the active stylus is located from the plurality of predetermined regions based on the pre-synchronization signal, and transmits the uplink signal only in the target region; and step 304: transmitting, via the touch screen, the uplink signal alternately in the plurality of predetermined regions.

In an implementation, if the touch screen does not detect the pre-synchronization signal within a preset duration, or the synchronization between the active stylus and the touch screen fails for N consecutive times, where N is a preset positive integer larger than 1, the touch screen switches to an original synchronization mode of the USI protocol, thereby ensuring the compatibility of the protocol. For example, if the touch screen does not detect the pre-synchronization signal within the preset duration, or the synchronization between the active stylus and the touch screen fails for N consecutive times, the touch screen switches to a synchronization mode of transmitting the uplink signal alternately in the plurality of regions.

Figure 12:
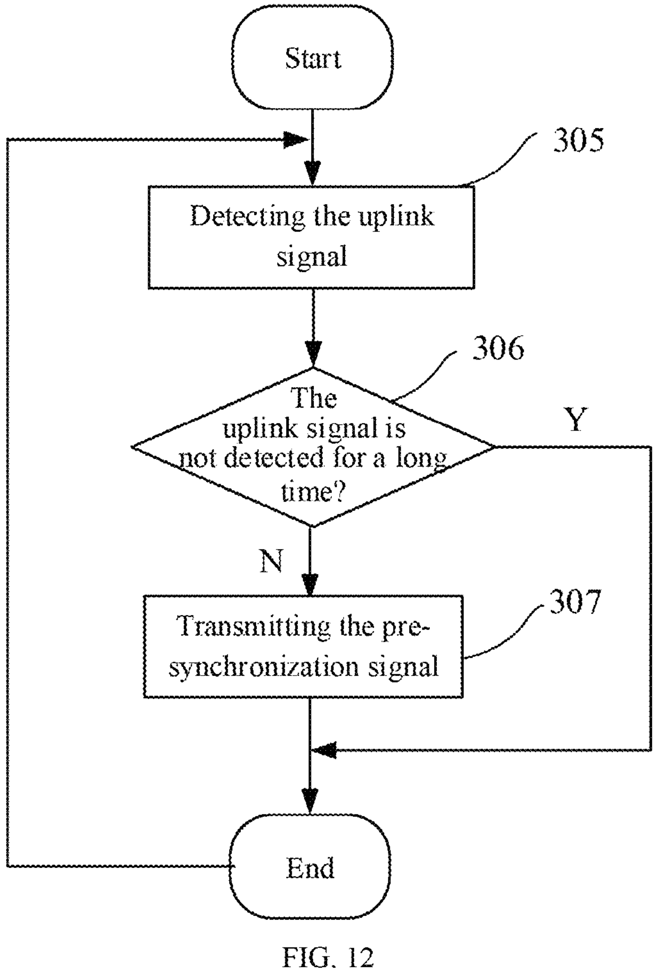
FIG. 12 is a schematic diagram of an operation flow of an active stylus when no uplink signal is detected for a long time.

In an implementation, if the active stylus does not detect the uplink signal within the preset duration, the active stylus stops transmitting the pre-synchronization signal. If the active stylus fails to detect the uplink signal within the preset duration, for example, within 3 min, it is possible that its user does not use the active stylus for writing in a recent period. The active stylus can only detect the uplink signal and stop transmitting the pre-synchronization signal, thereby reducing power consumption of the active stylus. For example, the operations implemented by the active stylus as shown in FIG. 12 include: step 305: detecting the uplink signal via the active stylus;

step 306: determining, via the active stylus, whether the uplink signal is not detected within a preset duration;

if the active stylus detects the uplink signal, step 307 is implemented; and if the active stylus does not detect the uplink signal within the preset duration, it is possible that its user does not use the active stylus for writing in the recent period. The active stylus may switch to the original synchronization mode of the USI protocol, no longer transmits the pre-synchronization signal, and only detects the uplink signal to reduce the power consumption of the active stylus; and step 307: transmitting, via the active stylus, the pre-synchronization signal.

To sum up, in the embodiments of the present disclosure, temporal synchronization between the touch screen and the active stylus is sped up by additionally providing the pre-synchronization signal during the synchronization, thereby shortening the synchronization duration by 2 frames, usually 32 ms, compared with the mode of only scanning alternately in regions. Particularly, in a scenario with noise interference, the synchronization method of the present disclosure ensures stable synchronization between the touch screen and the active stylus.

In addition, the synchronization method of the present disclosure solves the problem that the active stylus cannot be used normally because the uplink signal becomes noisier and the active stylus tends to fail in synchronization in a scenario with a high-noise picture on the display screen, interference from the charger, or interference from the outside of the touch screen.

After actual verification, in an environment with noise interference, when the user clicks multiple times with the active stylus, there is a probability of more than 50% when the original USI protocol is used that a user click operation misses a response due to slow synchronization speed. After the synchronization method of the present disclosure is used, success rate of the user click operations in a same environment reaches more than 90%, and the probability of missing a response is merely smaller than 10%, thereby substantially optimizing the user experience in the noise environment.

In addition, the synchronization method of the present disclosure can be well compatible with the synchronization mechanism of the original USI protocol, and does not affect the existing exchange and use of the active stylus and the touch screen based on the USI protocol.

Figure 13:
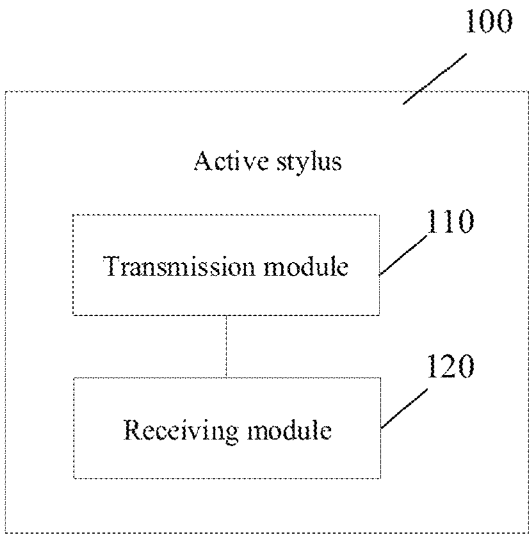
FIG. 13 is a schematic block diagram of structure of an active stylus in an embodiment of the present disclosure.

As shown in FIG. 13, the present disclosure further provides an active stylus. As shown in FIG. 13, the active stylus 100 comprises:

a transmission module 110 configured to transmit a pre-synchronization signal to a touch screen, wherein the pre-synchronization signal is used to determine a target region where the active stylus is located on the touch screen, so that the touch screen transmits an uplink signal in the target region; and a receiving module 120 configured to detect the uplink signal, and perform, in response to the uplink signal being detected, time synchronization with the touch screen based on the uplink signal.

In an implementation, the transmission module 110 is further configured to: stop, in response to failure to detect the uplink signal by the receiving module within a preset duration, transmitting the pre-synchronization signal.

In an implementation, the transmission module 110 is further configured to: transmit, in response to the uplink signal, a downlink signal to the touch screen, wherein the downlink signal is used to determine the position of the tip portion of the stylus.

In an implementation, a signal length of the pre-synchronization signal is smaller than a signal length of the downlink signal.

In an implementation, a frequency point of the pre-synchronization signal is different from a frequency point of the downlink signal; and/or encoding of the pre-synchronization signal is different from encoding of the downlink signal; and/or the pre-synchronization signal is not encoded, while the downlink signal is an encoded signal; and/or a format of the pre-synchronization signal is different from a format of the downlink signal.

In an implementation, the touch screen comprises a plurality of regions for transmitting the uplink signal, and the plurality of regions include the target region.

It should be understood that the above description for the operations implemented by the active stylus in the method 300 may be referred to for specific details of the active stylus 100, which will not be repeated here for the sake of brevity.

Figure 14:
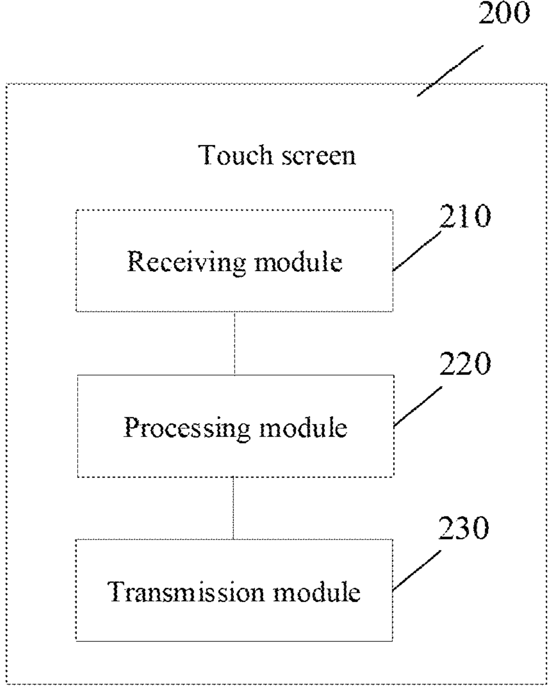
FIG. 14 is a schematic block diagram of structure of a touch screen in an embodiment of the present disclosure.

As shown in FIG. 14, the present disclosure further provides a touch screen. As shown in FIG. 14, the touch screen 200 comprises:

a receiving module 210 configured to detect a pre-synchronization signal transmitted from an active stylus;

a processing module 220 configured to determine, in response to the pre-synchronization signal being detected by the receiving module, a target region where the active stylus is located on the touch screen based on the pre-synchronization signal; and a transmission module 230 configured to transmit an uplink signal to the active stylus in a region where the position of the stylus tip portion is located among a plurality of regions of the touch screen, wherein the uplink signal is used to perform time synchronization between the active stylus and the touch screen.

In an implementation, the touch screen comprises the plurality of regions for transmitting the uplink signal, and the plurality of regions include the target region.

In an implementation, the touch screen 200 comprises a plurality of groups of emission channels configured to transmit the uplink signal, and the plurality of regions are regions where the plurality of groups of emission channels are located respectively.

In an implementation, the transmission module 230 is further configured to: not transmit the uplink signal before the pre-synchronization signal is detected; or transmit the uplink signal alternately in the plurality of regions before the pre-synchronization signal is detected.

In an implementation, the receiving module 210 is further configured to receive a downlink signal transmitted from the active stylus, and determine the position of the stylus tip portion based on the downlink signal.

In an implementation, a signal length of the pre-synchronization signal is smaller than a signal length of the downlink signal.

In an implementation, a frequency point of the pre-synchronization signal is different from a frequency point of the downlink signal; and/or encoding of the pre-synchronization signal is different from encoding of the downlink signal; and/or the pre-synchronization signal is not encoded, while the downlink signal is an encoded signal; and/or a format of the pre-synchronization signal is different from a format of the downlink signal.

It should be understood that the above description for the operations implemented by the touch screen in the method 300 may be referred to for specific details of the touch screen 200, which will not be repeated here for the sake of brevity.

The present disclosure further provides an apparatus for synchronization between an active stylus and a touch screen. The apparatus comprises a processor and a memory. The memory is configured to store a computer program. The processor is configured to invoke and run the computer program stored in the memory to implement the steps implemented by the active stylus in any one of the above embodiments, or implement the steps implemented by the touch screen.

The present disclosure further provides a communication system, comprising the active stylus and the touch screen in any one of the above embodiments.

The touch screen in the embodiments of the present disclosure may be a touch screen in an electronic device. As an example and non-restrictively, the electronic device may be a portable or mobile computing device such as a terminal device, a mobile phone, a tablet computer, a notebook computer, a desktop computer, a game device, a vehicle electronic device, or a wearable smart device, or may be other electronic devices such as an electronic database, an automobile, or an Automated Teller Machine (ATM). The wearable smart device includes a device that has complete functions and a large size, and can realize complete or partial functions without relying on a smart phone, such as a smart watch or smart glasses, and includes a device that only focuses on a certain type of application functions and needs to be used in cooperation with other devices such as a smart phone, for example, various smart bracelets and smart jewelries for monitoring physical signs.

It should be noted that the embodiments described in the present disclosure and/or the technical features in the embodiments may be combined with each other in any way in the case of no conflict, and the combined technical solutions should also be encompassed within the scope of protection of the present disclosure.

The system, the apparatus, and the method disclosed in the embodiments of the present disclosure may be implemented in other ways. For example, some features of the method embodiments described above may be neglected, or may not be implemented. The above-described apparatus embodiments are merely illustrative, the division of the units is only a logical function division, other division manners may be available during actual implementations, and a plurality of units or components may be combined or may be integrated into another system. In addition, the coupling between the units or the coupling between the components may be direct coupling or may be indirect coupling, and the above-mentioned coupling includes electrical connection, mechanical connection, or other forms of connection.

Those skilled in the art can clearly understand that, for convenience and simplicity of description, corresponding processes and technical effects in the above method embodiments may be referred to for specific working process of the apparatus and the device described above and technical effects thereof, which will not be repeated here.

It should be understood that the specific examples in the embodiments of the present disclosure are provided only to help those skilled in the art to better understand the embodiments of the present disclosure, rather than limiting the scope of the embodiments of the present disclosure. Those skilled in the art may make various improvements and modifications on the basis of the above embodiments, and these improvements or modifications are all encompassed within the scope of protection of the present disclosure.

While the above description merely provides specific embodiments of the present disclosure, the scope of protection of the present disclosure is not limited to the specific embodiments. Any person skilled in the art can easily conceive of alterations or replacements within the technical scope disclosed in the present disclosure. All these alterations or replacements should be encompassed within the scope of protection of the present disclosure. Therefore, the scope of protection of the present disclosure should be determined by the scope of protection of the claims.

The invention claimed is:

1. A method for synchronization between an active stylus and a touch screen, being implemented by the active stylus and comprising:

transmitting a pre-synchronization signal to the touch screen, wherein the pre-synchronization signal is used to determine a target region where the active stylus is located on the touch screen, so that the touch screen transmits an uplink signal in the target region;

detecting the uplink signal;

performing, in response to the uplink signal being detected, time synchronization with the touch screen based on the uplink signal, and transmitting, in response to the uplink signal, a downlink signal to the touch screen, wherein the downlink signal is used to determine the position of the tip portion of the stylus, wherein a signal length of the pre-synchronization signal is smaller than a signal length of the downlink signal.

2. The method according to claim 1, wherein the method further comprises:

stopping, in response to the uplink signal not being detected within a preset duration, transmitting the pre-synchronization signal.

3. The method according to claim 1, wherein a frequency point of the pre-synchronization signal is different from a frequency point of the downlink signal; and/or encoding of the pre-synchronization signal is different from encoding of the downlink signal; and/or the pre-synchronization signal is not encoded, while the downlink signal is an encoded signal; and/or a format of the pre-synchronization signal is different from a format of the downlink signal.

4. The method according to claim 1, wherein the touch screen comprises a plurality of regions for transmitting the uplink signal, and the plurality of regions include the target region.

5. A method for synchronization between an active stylus and a touch screen, being implemented by the touch screen and comprising:

detecting a pre-synchronization signal transmitted from the active stylus;

determining, in response to the pre-synchronization signal being detected, a target region where the active stylus is located on the touch screen based on the pre-synchronization signal;

transmitting an uplink signal to the active stylus in the target region, wherein the uplink signal is used to perform time synchronization between the active stylus and the touch screen, and receiving a downlink signal transmitted from the active stylus, and determining the position of the tip portion of the stylus based on the downlink signal, wherein a signal length of the pre-synchronization signal is smaller than a signal length of the downlink signal.

6. The method according to claim 5, wherein the touch screen comprises a plurality of regions for transmitting the uplink signal, and the plurality of regions include the target region.

7. The method according to claim 6, wherein the method further comprises:

transmitting, in response to the pre-synchronization signal not being detected within a preset duration, or synchronization between the active stylus and the touch screen failing for N consecutive times, the uplink signal alternately in the plurality of regions, wherein N is a preset positive integer larger than 1.

8. The method according to claim 6, wherein the method further comprises:

not transmitting the uplink signal before the pre-synchronization signal is detected; or transmitting the uplink signal alternately in the plurality of regions before the pre-synchronization signal is detected.

9. The method according to claim 5, wherein a frequency point of the pre-synchronization signal is different from a frequency point of the downlink signal; and/or encoding of the pre-synchronization signal is different from encoding of the downlink signal; and/or the pre-synchronization signal is not encoded, while the downlink signal is an encoded signal; and/or a format of the pre-synchronization signal is different from a format of the downlink signal.

10. An active stylus, comprising:

a transmission module configured to transmit a pre-synchronization signal to a touch screen, wherein the pre-synchronization signal is used to determine a target region where the active stylus is located on the touch screen, so that the touch screen transmits an uplink signal in the target region; and a receiving module configured to detect the uplink signal, and perform, in response to the uplink signal being detected, time synchronization with the touch screen based on the uplink signal, wherein the transmission module is further configured to transmit, in response to the uplink signal, a downlink signal to the touch screen, the downlink signal is used to determine the position of the tip portion of the stylus, and a signal length of the pre-synchronization signal is smaller than a signal length of the downlink signal.

11. The active stylus according to claim 10, wherein the transmission module is further configured to:

stop, in response to failure to detect the uplink signal by the receiving module within a preset duration, transmitting the pre-synchronization signal.

12. The active stylus according to claim 10, wherein a frequency point of the pre-synchronization signal is different from a frequency point of the downlink signal; and/or encoding of the pre-synchronization signal is different from encoding of the downlink signal; and/or the pre-synchronization signal is not encoded, while the downlink signal is an encoded signal; and/or a format of the pre-synchronization signal is different from a format of the downlink signal.

13. The active stylus according to claim 10, wherein the touch screen comprises a plurality of regions for transmitting the uplink signal, and the plurality of regions include the target region.

* * * * *